2,790,707

METHOD FOR REMOVING CHLORATES AND CHLORIDES FROM CONCENTRATED ELECTROLYTIC SODIUM HYDROXIDE

Arthur K. Johnson, Concord, Calif., assignor to The Dow Chemical Company, Midland, Mich., a corporation of Delaware No Drawing. Application October 3, 1955, Serial No. 538,253

3 Claims. (Cl. 23—184)

This invention relates to an improvement in the method of removing sodium chlorate and sodium chloride from aqueous sodium hydroxide solutions of from about 40 to about 50 to 55 percent sodium hydroxide content.

It is known that the electrolytic process for making caustic soda produces a liquor which contains sodium chlorate and sodium chloride. The electrolytic cell liquor is concentrated, by evaporation of water, and much of the sodium chloride crystallizes out during the process, leaving, however, some chloride and most of the chlorate in the concentrated liquor. For many industrial uses of caustic soda, these impurities must be reduced to negligible values. The sodium chlorate content of 50 percent caustic soda liquor from electrolytic processes may be as high as 1500 parts per million parts of dissolved sodium hydroxide, but the consuming trade prefers to have no chlorate. The sodium chloride content of 50 percent caustic soda liquor may be as high as 2 percent or more of the weight of dissolved sodium hydroxide, but should be kept much lower for many uses. If caustic liquors are to be evaporated further so as to produce a solid caustic soda, the latter should be the equivalent of at least 76 percent Na$_2$O, or nearly 98 percent sodium hydroxide. It is impossible to attain such purity in solid sodium hydroxide by mere concentration of a 50 percent liquor in which, based on the weight of sodium hydroxide, there is the normal 1.8 to 2 percent sodium chloride as well as the usual trace amounts of carbonates and other impurities.

For these and related reasons, much attention has been paid to methods for destroying chlorates and for removing chlorides from caustic soda liquors. Several processes for removing the sodium chloride are based on the introduction of sodium sulfate, or sulfuric acid, to form a complex insoluble salt, NaOH.NaCl.Na$_2$SO$_4$. This requires the use of 1.64 parts by weight of sulfate ion, i. e., 2.43 parts by weight of sodium sulfate, for each part by weight of sodium chloride to be removed.

One of the processes for reducing sodium chlorate to sodium chloride in strong caustic liquors is described by Davies in U. S. 2,258,545, and is based on the discovery that this result can be achieved by introducing from 75 to 85 percent as much ferrous ion as would be required by the following Equation 1, and boiling the solution to precipitate magnetic iron oxide. It should be noted that at temperatures much over 80° C., concentrated alkali solutions containing chlorate and chloride are highly corrosive to iron vessels, and the reaction and subsequent evaporation are carried out in expensive nickel equipment. In Equation 1 it is assumed that the ferrous ion is supplied as ferrous sulfate.

(1) 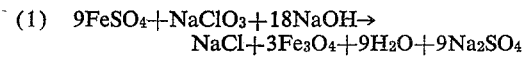
$$9FeSO_4 + NaClO_3 + 18NaOH \rightarrow NaCl + 3Fe_3O_4 + 9H_2O + 9Na_2SO_4$$

Davies discovered that the proportions could be altered to use only 75 percent as much ferrous ion, while still reducing the same amount of chlorate. The effect of this change is shown in partial equations 2 and 3:

(2) 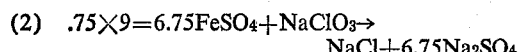
$$.75 \times 9 = 6.75 FeSO_4 + NaClO_3 \rightarrow NaCl + 6.75 Na_2SO_4$$

(3) 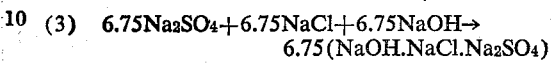
$$6.75 Na_2SO_4 + 6.75 NaCl + 6.75 NaOH \rightarrow 6.75(NaOH.NaCl.Na_2SO_4)$$

The stoichiometric amount of ferrous sulfate, according to Equation 1, is 12.8 parts by weight for each part of sodium chlorate. However, following the teachings of Davies, as little as 75 percent of this amount is used, or 9.62 parts by weight of ferrous sulfate per part of sodium chlorate. Such an amount of ferrous sulfate produces 9 parts by weight of sodium sulfate, and this, in turn can form the above-described complex with, and remove from solution, 3.7 parts by weight of sodium chloride. Since there is produced 0.55 part by weight of sodium chloride for each part of sodium chlorate reduced, the precipitation of 3.7 parts of sodium chloride in the complex salt represents a decrease of only 3.15 parts of sodium chloride from the original solution for each part of chlorate, i. e., for each 9.62 parts of ferrous sulfate employed, or 0.328 part of sodium chloride decrease from the amount originally in solution for each part by weight of ferrous sulfate employed.

It would be desirable, and it is the principal object of this invention, to provide an improved method for treating caustic soda liquors containing sodium chlorate and sodium chloride, and especially electrolytic caustic soda liquors of near 50 percent concentration, so as to effect a greater reduction in the amounts of these impurities per unit weight of reagent than has been possible before. A related object is to provide such a method which can be carried out in iron equipment without significant corrosion of the equipment and contamination of the alkaline liquor. A specfic object is to provide a new and useful complex sodium ferrite-chloride, in which form there can be removed from alkali liquors all of the chloride formed by reduction of chlorate as well as a significant part of that originally present as sodium chloride.

According to the present invention, these and related objects are attained by the formation of new complex salts, under conditions to be defined hereinafter having the formulas (NaFeO$_2$)$_3$.(NaCl)$_2$ and (Na$_2$FeO$_2$)$_3$.(NaCl)$_2$. The chlorate reduction and salt removal reactions of the present invention are represented by the following Equations 4 and 5, and the net effect of the reactions is shown in Equation 6.

(4) 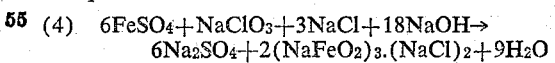
$$6FeSO_4 + NaClO_3 + 3NaCl + 18NaOH \rightarrow 6Na_2SO_4 + 2(NaFeO_2)_3.(NaCl)_2 + 9H_2O$$

(5) 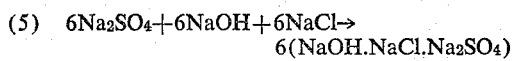
$$6Na_2SO_4 + 6NaOH + 6NaCl \rightarrow 6(NaOH.NaCl.Na_2SO_4)$$

(6) 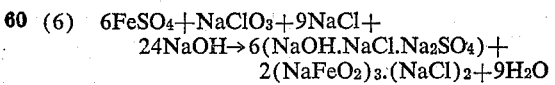
$$6FeSO_4 + NaClO_3 + 9NaCl + 24NaOH \rightarrow 6(NaOH.NaCl.Na_2SO_4) + 2(NaFeO_2)_3.(NaCl)_2 + 9H_2O$$

Under the conditions in which these reactions occur, there is required only 8.55 parts by weight of ferrous sulfate for each part of sodium chlorate in the solution or 88.9 percent as much as in the prior process. Each part by weight of ferrous sulfate employed in the present reaction results in the removal of 0.578 part by weight sodium chloride originally present in the solution, in addition to that formed by reduction of chlorate. This is in contrast to the 0.328 part of original sodium chloride removed by a unit weight of ferrous sulfate in the prior process, and represents 176 percent effectiveness for the ferrous sulfate, as compared with the prior process. Since only 88.9 percent as much ferrous sulfate is used as before, there is removed from solution 1.56 times as much of the original sodium chloride as before, while reducing the same amount of sodium chlorate.

It has been found that the reaction whereby the advantageously high salt removal accompanies the chlorate reduction occurs only at temperatures from 20° C. to 80° C. and only in caustic soda liquors of over 40 percent concentration. With liquors of lower concentration, of the order of 30 percent, the chlorate reduction with ferrous sulfate is accompanied by the formation of magnetic iron oxide, $Fe_3O_4$, and the only salt removal is in the form of the well known complex $NaOH \cdot NaCl \cdot Na_2SO_4$. Hence, the present invention is not applicable at such dilutions. Similarly, at reaction temperatures significantly above 80° C., only the same triple complex and magnetic iron oxide are obtained, and there is only the amount of salt removed from the solution that would be expected from the prior process.

In carrying out the method of the invention, ferrous sulfate, preferably in the form of about a 20 percent solution in water, and in amount from 8.55 to 9.0 times the weight of sodium chlorate in the solution to be treated, is added to an aqueous solution of sodium hydroxide of at least 40 and not to exceed 55 percent concentration, containing sodium chlorate and sodium chloride as impurities. The resulting mixture is held at a temperature at which the alkali solution is liquid, but not significantly above 80° C., until the reduction of chlorate to chloride is essentially complete. The reaction mixture is filtered to separate the iron-salt complex and the alkali-chloride-sulfate complex. The chlorate reduction may be carried out safely in iron equipment if the reaction temperature is kept at or below 60° C. The preferred temperatures are from 50° C. to 60° C. The time required for reduction of chlorate is shorter at the higher temperatures than when the reaction is effected near room temperature, but in most cases, large volumes of caustic liquor can be substantially freed from chlorate by the present process in from 2 to 12 hours. Thus, in one example, a 50 percent solution containing 15 tons of sodium hydroxide, and having 1400 parts by weight of sodium chlorate for each million parts of sodium hydroxide (2.8 pounds per ton, dry basis) was treated according to the invention at 53° C. Chlorate analyses were made at frequent intervals to trace the course of the reaction, with the following results:

| Time, minutes: | Chlorate content, P. P. M. |
| --- | --- |
| 0 | 1,400 |
| 15 | 730 |
| 45 | 390 |
| 75 | 120 |
| 105 | 60 |
| 135 | 40 |
| 160 | 20 |
| 175 | below 10 |

To illustrate the effect of the present method on the removal of sodium chloride from 50 percent sodium hydroxide liquors having initial salt concentration of about 2.0 percent (40 pounds per ton of NaOH), and having various sodium chlorate concentrations so that various amounts of ferrous sulfate were employed, two series of determinations were made, one at 25° C. and the other at 80° C. In each case the reduction in salt concentration was determined and related to the amount of ferrous sulfate used. This was compared with the amount of salt removal theoretically possible if this were accomplished only via the hydroxide-chloride-sulfate complex, both with and without allowing for the effect of dilution due to the use of a 20 percent ferrous sulfate solution. The results appear below.

| Ferrous Sulfate required, pounds per ton of NaOH | Residual salt, pounds per ton of NaOH | | | |
| --- | --- | --- | --- | --- |
| | Actual | | Predicted on basis of triple salt | |
| | 25° Runs | 80° Runs | Ignoring dilution | Allowing for dilution |
| 4 | 36.4 | | 38.6 | 37.2 |
| 6 | 35.2 | | 37.6 | 36.2 |
| 8 | | 33.6 | 37.0 | 35.6 |
| 10 | 32.6 | | 36.2 | 34.8 |
| 12 | | 30.8 | 35.4 | 34.0 |
| 14 | 30.0 | | 34.6 | 33.2 |
| 16 | | 28.4 | 33.8 | 32.4 |
| 18 | 27.2 | | 33.0 | 31.6 |
| 20 | | 26.2 | 32.4 | 31.0 |

It is seen that, in every instance, about 50 percent more salt was removed than could be expected purely on the basis of the formation of the hydroxide-chloride-sulfate complex. In each instance, the chlorate originally present was substantially completely reduced.

In a specific example, given by way of illustration and not of limitation, the liquor to be treated contained 49.6 percent by weight of sodium hydroxide. It also contained the following percentages of impurities, based on the weight of sodium hydroxide:

| | |
| --- | --- |
| Sodium carbonate | 0.21 |
| Sodium chloride | 1.87 |
| Sodium chlorate | .14 |
| Sodium sulfate | .024 |
| Iron | .0006 |

A known volume of this solution containing 40 tons of dissolved sodium hydroxide was heated to 60° C. and there was added 24 pounds of ferrous sulfate for each ton of sodium hydroxide (8.55 pounds per pound of sodium chlorate). The mixture was stirred for 3 hours, by which time the chlorate content was reduced to an undetectable small value less than 5 parts per million. The solution was filtered to separate it from the precipitated ferrite-chloride and hydroxide-chloride-sulfate complexes. The filtrate was cooled and analyzed for sodium chloride, and found to contain 24.0 pounds for each ton of NaOH, or only 1.2 percent. The carbonate content had also been reduced, due to the precipitation of $3Na_2SO_4 \cdot 5Na_2CO_3$, and, when evaporated to dryness the solid caustic soda assayed over 76 percent $Na_2O$.

By way of contrast, when some of the same batch of sodium hydroxide liquor was treated with 27 pounds of ferrous sulfate, per ton of sodium hydroxide (9.65 pounds per pound of sodium chlorate), and the mixture was heated near its boiling point of 142° C., and filtered, the precipitate was a mixture of magnetic iron oxide and the hydroxide-chloride-sulfate complex. The filtrate was free from chlorate but contained 28.6 pounds of sodium chloride per ton of NaOH, or 1.43 percent. This solution, when evaporated to dryness, gave a solid caustic soda which assayed 75.8 percent $Na_2O$.

It is to be understood that, if desired, the solutions which have been treated in accordance with the present invention to free them from chlorate and to decrease their sodium chloride content may be subjected to subsequent conventional finishing treatments, as with strontium sulfate to decrease the iron content, or digestion at 30°–35° C. to decrease sulfate content of the treated liquor. Such after-treatments form no part of the present invention.

I claim:
1. The process which comprises dissolving in an aque- ous solution of sodium hydroxide of from 40 to 55 percent concentration, and containing sodium chlorate and sodium chloride as impurities, an amount of ferrous sulfate which is from 8.55 to 9.0 times the weight of sodium chlorate in the solution, maintaining the resulting mixture at a temperature of at least 20° C. at which the alkali solution is liquid, but not significantly above 80° C., until the reduction of chlorate to chloride is essentially complete and filtering to remove insoluble complexes containing sodium chloride, thereby to make the solution essentially free from chlorate and to decrease the amount of sodium chloride therein by an amount near 0.57 part by weight for each part of ferrous sulfate used in the process.

2. The process claimed in claim 1, wherein the ferrous sulfate is added as an aqueous solution.

3. The process claimed in claim 1, wherein the mixture is maintained in the range from about 50° C. to about 60° C. during the chlorate reduction reaction.

References Cited in the file of this patent

UNITED STATES PATENTS 2,258,545    Davies _____ Oct. 7, 1941